Oct. 21, 1924.
I. BENKÖ
1,512,192
APPARATUS FOR LIMITING THE FORCE TRANSMITTED IN TOOLS AND MACHINES
Filed March 5, 1924     2 Sheets-Sheet 1
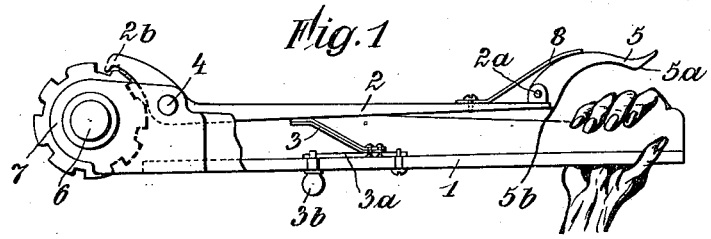
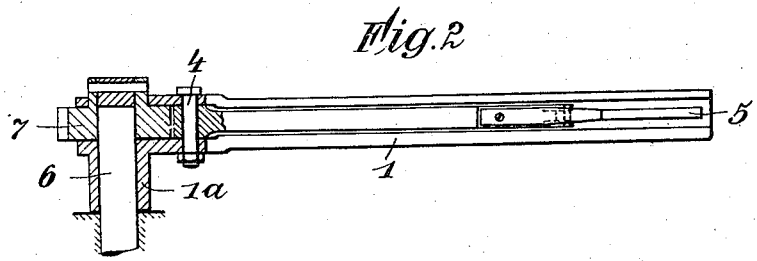
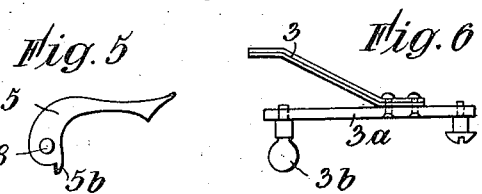
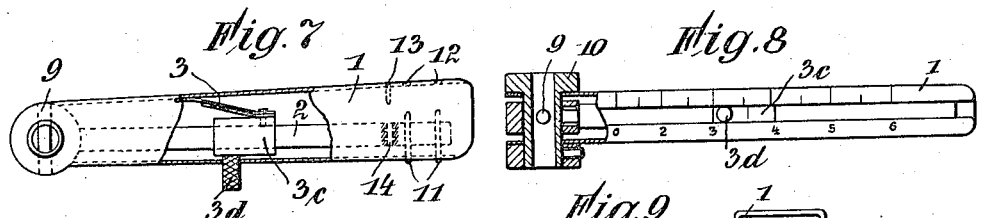
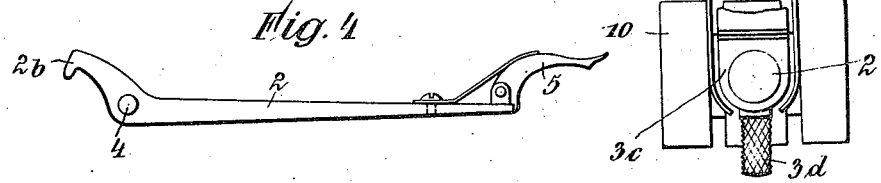
Inventor
I. Benkö
by Langner, Parry, Card & Langner
Att'ys.

Oct. 21, 1924.  
I. BENKÖ  
1,512,192  
APPARATUS FOR LIMITING THE FORCE TRANSMITTED IN TOOLS AND MACHINES  
Filed March 5, 1924  2 Sheets-Sheet 2

Inventor  
I. Benkö  
by Langner, Parry, Card & Langner  
Attys.

Patented Oct. 21, 1924.

1,512,192

UNITED STATES PATENT OFFICE.

IVAN BENKÖ, OF VIENNA, AUSTRIA.

APPARATUS FOR LIMITING THE FORCE TRANSMITTED IN TOOLS AND MACHINES.

Application filed March 5, 1924. Serial No. 697,114.

*To all whom it may concern:*

Be it known that I, IVAN BENKÖ, a citizen of Hungary, residing at Vienna, Republic of Austria, have invented new and useful Improvements in Apparatus for Limiting the Force Transmitted in Tools and Machines, of which the following is a specification.

My invention relates to apparatus for limiting the force transmitted in tools and machines. The object of my invention is to prevent an attendant or an operating element from exerting a force exceeding a predetermined limit on an operated element. With this object in view my invention consists in that the force is transmitted by an operated element such as a lever or arm through the medium of a spring to another element, such as a lever or arm, the said spring being preferably bodily adjustable relatively to the said elements whereby the force transmitted from the first named or power element to the second named or load element may be adjusted at will. The load element may be rigidly or detachably connected with the part of the machine or the like to be operated. When the force exerted on its force arm exceeds a predetermined limit, the spring action is overcome and the force element and load element are moved relatively to each other. This relative movement may be utilized in various ways to indicate to the attendant that the force exerted exceeds the predetermined limit. Furthermore the indicating device may be such that it also indicates whether the force exerted is between a predetermined maximum and minimum value.

In the annexed drawings I have shown by way of example various embodiments of my invention.

Figure 10:
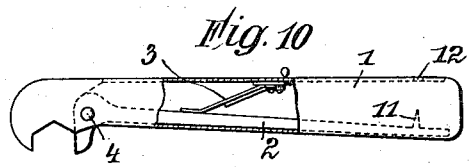
Figure 10A:
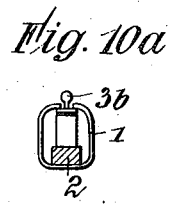
Figure 12A:
Figure 11:
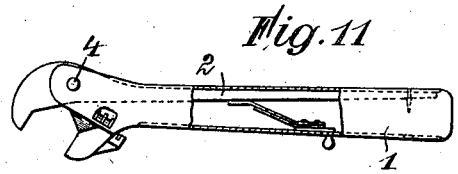
Figure 12:
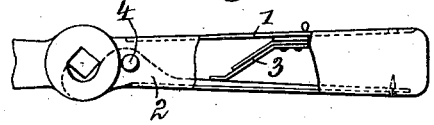
Figure 13:
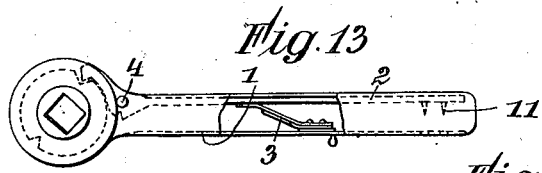
Figure 14:
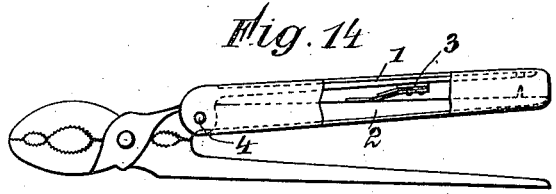
Figure 16:
Figure 15:
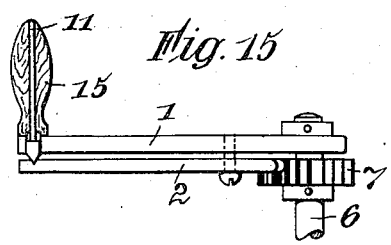

Fig. 1 is a plan view, Figs. 2 and 3 are side elevations as viewed from opposite directions and Figs. 4 to 6 show details of one embodiment of my improved apparatus. Fig 7 is a plan view partly in section, Fig. 8 a side elevation partly in section and Fig. 9 an end view of another embodiment of my invention, the latter figure being on a larger scale, Fig. 10 is a side elevation partly in section and Fig. 10$^a$ is an end view partly in section of a wrench to which my invention is applied, Fig. 11 is a view similar to Fig. 10 showing a wrench having an adjustable jaw, Fig. 12 is a plan view partly in section of a cutter and Fig. 12$^a$ is a pivoted cutter lever. Fig. 13 shows a ratchet drill and Fig. 14 a pair of tongs provided with my invention. Fig. 15 is a side elevation partly in section. Fig. 16 a front elevation and Fig. 17 a plan view partly in section of a hand crank to which my invention is applied.

In all the figures the power element is assumed to consist of an arm arm 1, and the load element is assumed to consist of a lever 2. Any force exerted on the power element or arm 1 is transmitted to the load element or lever 2 by a resilient element assumed in all the figures to consist of a spring 3 suitably interposed between the arm 1 and the lever 2. As shown in all the figures the load arm is pivoted at 4 to the power element or arm 1 or a part connected thereto and the resilient element or spring 3 is preferable bodily adjustable relatively to the power element and the load element, as shown in the drawings relatively to the pivot 4. By bodily adjusting the resilient element or spring 3 relatively to the pivot 4 the torque is varied which the power element or arm 1 can exert on the load element or lever 2 without appreciable deformation of the resilient element or spring 3. When a greater force is exerted on the power element or arm 1 than that corresponding to a given position of the resilient element relatively to the pivot 4, this resilient element and the load element or arm 2 will yield and the relative movement of the power element and the load element due to such yielding is utilized for operating a suitable apparatus for throwing out of operation the power element or arm 1 for indicating to the attendant that the predetermined force or torque has been exceeded.

In Figures 1 to 6 an indicating apparatus is shown which consists of an arm 5 pivoted to the load arm 2 which arm 5 comes into contact with the attendant's hand operating the power arm 1 whenever the spring 3 and the load arm 2 yield. In this way the attendant directly feels that he has exceeded the predetermined force.

As shown in Figures 1 to 4 the power arm 1 is free to turn on a spindle 6 by means of a boss 1$^a$ and a toothed wheel 7 is fast on or keyed to this spindle. The pivot pin 4 of the load lever is journaled in the power arm 1. The indicating arm 5 is pivoted at 2$^a$ to the load arm 2 and is acted upon by a spring 8. The load lever 2 carries at its inner end a pawl 2ᵇ adapted to engage with the teeth of the wheel 7 and the indicating lever 5 carries at its outer end a finger 5ᵃ and at its inner end a shoulder 5ᵇ adapted to engage with the outer end of the load lever 2 so that when the indicating arm 5 is turned by hand towards the power arm 1 the part 2ᵇ is disengaged from the toothed wheel 7.

The power arm is preferably hollow and is preferably U shaped in transverse section, so that the load lever 2 is partly or entirely embraced by the power lever. The force transmitting spring 3 is mounted on a slide 3ᵃ guided in a longitudinal slot 1ᵇ of the power lever 1 and adjustable by hand by means of a handle 3ᵇ projecting from the slot 1ᵇ.

When the torque due to the action of the pawl 2ᵇ on the toothed wheel 7 exceeds the constant torque on the load arm 2 due to the spring 3 which torque is determined by the initial tension of this spring and its distance from the pivot 4, then the load lever 2 is moved relatively to the power arm 1 as the spring 3 yields. This relative movement shows that the force exerted on the power arm exceeds the predetermined limit and may be indicated to the attendant in any suitable manner or may be utilized for throwing out of operation the power arm. As shown in Figures 1 to 4 the said relative movement of the power arm and load lever results in a movement of the indicating lever 5 which by coming into contact with the hand of the attendant operating the power arm makes him aware of the fact that he has exerted too great a force. But the indicating arm 5 might, when moved as above explained, operate an optical or an acoustic signal either directly or by making or breaking electric contacts, whereby such signals are operated or such relative movements or electrical contacts made or broken thereby may be utilized for throwing out of operation the power arm. Such utilizations of the relative movement of the power arm and load lever are obvious to those skilled in the art and are more particularly applicable in cases where the power arm is operated by a motor.

As shown in Figures 7 to 9 the load arm 2 is rigidly connected with the operating part of the device say by a pin 9. The device itself is not shown, it may be assumed that the boss 10 is connected for instance with the spindle of the tool or machine. The load arm is completely enclosed by the hollow power arm 1. In this case the spring 3 is bodily adjustable on the load arm, it may be mounted for instance on a sleeve 3ᶜ slidably on the load lever and provided with a handle 3ᵈ projecting through a longitudinal slot in the power arm, which may be provided with a scale permitting to adjust the spring bodily for different forces or torques or for different tools to which the power arm may be applied. The power arm is free to turn around the boss 10. The means for indicating the relative movement of the power arm and load lever whenever the force exerted on the former exceeds a predetermined limit consists in this case of pins 11 secured to the load lever 2 and holes 12 in the power arm through which the said pins are adapted to pass. When the force exerted on the power arm exceeds the predetermined limit for which the spring 3 is adjusted bodily the latter yields and the power arm 1 approaches the load arm 2 so that the pins 11 are caused to project through the holes 12 and this the attendant feels in his hand grasping the power arm. For the pins 11 other means operated by the relative movement of the power arm and load lever may be substituted such as optical or acoustic signals or electric contacts throwing into operation such signals or throwing out of operation the power arm. The arrangement may also be such that as long as a certain minimum force below the predetermined limit is not exerted on the power arm the pins 11 project through holes on the opposite side of such arm and are felt by the hand of the attendant grasping the power arm thereby indicating to the attendant that the minimum force desirable is not yet reached.

As long as the attendant does not feel the pins 11, neither on the one nor on the other part (palm or fingers) of his hand he is sure that the force he exerts is between the desired minimum and the permissible maximum.

It may be desirable in certain cases to make some provision for rigidly connecting the power arm with the load lever. This may be done by mounting on the power arm 1 an inwardly projecting pin 13 and a recess 14 in the load lever 2 in such position that normally when the two move relatively to each other the pin is adapted to enter into the recess.

When it is desired to rigidly connect the two, the recess 14 is covered by a slide, say the sleeve 3ᶜ, movable along the power arm, so that the pin 13 cannot enter the recess 14 and the power arm and load lever cannot move relatively to each other.

In the wrench shown in Fig. 10 one jaw of the same is secured to the power arm 1 and the other to the load lever 2 the latter being pivoted to the power arm at 4 and partly enclosed by the same. The load lever carries a pin 11 which is caused to project through a hole 12 in the power arm whenever the force exerted exceeds the predetermined limit as described with reference to Figs. 7 to 9. Instead of being rigidly connected to the power arm and load lever they can also be adjustably secured thereto, as shown in Fig. 11. Or cutting jaws might be attached to the power arm and load lever as shown in Fig. 12, the load lever being again fulcrumed in the power arm.

Fig. 13 shows a ratch drill the arrangement of the power arm and load lever being similar to that shown in Fig. 1 while the indicating elements 11 are similar to those shown in Fig. 7. Fig. 14 shows a pair of tongs to which my invention is applied. The power arm 1 is here mounted on one of the arms of the tongs which constitute the load lever 2. Such tongs permit to catch hold of a pipe or other article with a predetermined pressure thus protecting the latter from excessive pressure. Of course the load lever 2 might partly enclose the power arm.

Figure 17:
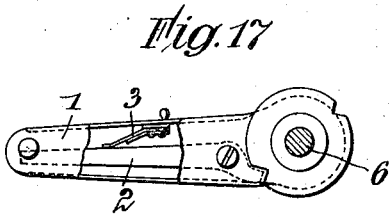

In the hand crank shown in Figs. 15 to 17 the power arm 1 is provided with a handle 15 and is loosely mounted on a spindle 6 while the load lever 2 engages into a ratchet wheel 7 the movement being transmitted from the power arm to the load lever by a spring 3 interposed between the two which are arranged the one above the other. When the power arm and the load lever move relatively to each other a pin 11 is actuated similarly as in the constructional forms shown in Figs. 7 to 9 and 10 and 14. In the case of Figs. 15 to 17, however, the pin 11 is actuated by a bevelled edge of the load lever cooperating with the correspondingly inclined bottom end of the pin 11 which is guided centrally in the handle 15. Thereby when the power arm and the load lever are moved relatively to each other whenever the predetermined force is exceeded, the pin 11 is pushed outwards in the handle 15, thus indicating an excess of strain put on the crank. The pin 11 may act directly on the hand of the attendant or it may serve to otherwise indicate this fact as stated above.

The invention is applicable to any tool apparatus or machine where it is desired to stop the force exerted on a given part below a predetermined limit whether the movement to be transmitted is a rotary or a reciprocating one.

Of course besides adjusting bodily the resilient bodies or springs their initial tension may be adjusted in the well known manner.

What I claim is:

1. In combination with a power element a load element adapted to move relatively to the power element and a resilient body interposed between the two said elements and adapted to transmit movement from the power element to the load element and means for bodily adjusting the said resilient body relatively to the said elements.

2. In combination with a power element a load element pivoted to the power element and a resilient body interposed between the two said elements and adapted to transmit movement from the power element to the load element and means for bodily adjusting the said resilient body relatively to the said elements.

3. In combination with a power arm a load lever pivoted to the power arm and a resilient body interposed between the two said elements and adapted to transmit movement from the power element to the load element and means for bodily adjusting the said resilient body relatively to the said elements.

4. In combination with a power arm a load lever pivoted to the power arm and a spring interposed between the said arm and lever and adapted to transmit movement from the power arm to the load lever and means for bodily adjusting the said spring relatively to the pivot pin connecting the power arm and the load lever.

5. In combination with a power element a load element adapted to move relatively to the power element and a resilient body interposed between the two said elements and adapted to transmit movement from the power element to the load element and means for bodily adjusting the said resilient body relatively to the said elements the initial tension of the said resilient body being adjustable.

6. In combination with a power element a load element pivoted to the power element and a resilient body interposed between the two said elements and adapted to transmit movement from the power element to the load element and means for bodily adjusting the said resilient body relatively to the said elements the initial tension of the said resilient body being adjustable.

7. In combination with a power arm a load lever pivoted to the power arm and a resilient body interposed between the two said elements and adapted to transmit movement from the power element to the load element and means for bodily adjusting the said resilient body relatively to the said elements the initial tension of the said resilient body being adjustable.

8. In combination with a power arm a load lever pivoted to the power arm and a spring interposed between the said arm and lever and adapted to transmit movement from the power arm to the load lever and means for bodily adjusting the said spring relatively to the pivot pin connecting the power arm and load lever, the initial tension of the said spring being adjustable.

9. In combination with a power element a load element adapted to move relatively to the said power element, a resilient body interposed between the two elements and adapted to transmit movement from the power element to the load element and furthermore adapted to yield whenever the force exerted on the power element exceeds a predetermined limit, whereby the said elements are moved relatively to each other and means operated by such relative movement of the said two elements for indicating such relative movement.

10. In combination with a power element a load element adapted to move relatively to the said power element, a resilient body interposed between the two elements and adapted to transmit movement from the power element to the load element the said resilient body being under initial tension and adapted to yield whenever the force exerted on the power element exceeds a predetermined limit whereby the said elements are moved relatively to each other and means operated by such relative movement of the said two elements for indicating such relative movement.

11. In combination with a power element a load element adapted to move relatively to the said power element, a resilient body interposed between the two elements and adapted to transmit movement from the power element to the load element the said resilient body being under initial tension and adapted to yield whenever the force exerted on the power element exceeds a predetermined limit whereby the said elements are moved relatively to each other and means operated by such relative movement of the said two elements for indicating such relative movement and means for bodily adjusting such resilient body relatively to the power element and load element.

12. In combination with a power element a load element adapted to move relatively to the said power element, a resilient body interposed between the two elements and adapted to transmit movement from the power element to the load element the said resilient body being under initial tension and adapted to yield whenever the force exerted on the power element exceeds a predetermined limit whereby the said elements are moved relatively to each other and means operated by such relative movement of the said two elements for indicating such relative movement and means for bodily adjusting such resilient body relatively to the power element and load element the initial tension of the said resilient body being adjustable.

13. In combination with a power element a load element pivoted to the power element, a resilient body interposed between the two elements and adapted to transmit movement from the power element to the load element, means for bodily adjusting the resilient body relatively to the pivot connecting the two said elements the resilient body being adapted to yield whenever the force exerted on the power element exceeds a predetermined limit whereby the said elements are moved relatively to each other and means operated by such relative movement of the said two elements for indicating such relative movement.

14. In combination with a power arm a load lever pivoted to the power arm, a spring interposed between the power arm and the load lever, means for bodily adjusting such spring relatively to the pivot connecting the power arm and load lever, such spring being adapted to yield whenever the force exerted on the power arm exceeds a predetermined limit whereby the power arm and the load lever are moved relatively to each other and means operated by such relative movement of the power arm and load lever for indicating such relative movement.

15. In combination with a power element a load element pivoted to the power element a spring interposed between the two elements such spring being slidably mounted on one of the said elements and bearing on the other and adapted to yield whenever the force exerted on the power element exceeds a predetermined limit whereby the power element and the load element are moved relatively to each other and means operated by such relative movement of the two elements for indicating such relative movement.

16. In combination with a hand actuated power arm a load lever pivoted to the power arm, a spring interposed between the power arm and the load lever, means for adjusting the said spring relatively to the pivot connecting the power arm and load lever such spring being adapted to yield whenever the force exerted on the power arm exceeds a predetermined limit whereby the power arm and load lever are moved relatively to each other and means operated by such relative movement of the power arm and load lever such means comprising an element adapted to come into contact with the hand actuating the power arm, whenever the power arm and the load lever are thus moved relatively to each other.

17. In combination with a hand actuated power arm a load lever pivoted to the power arm, a spring interposed between the power arm and load lever, means for adjusting the said spring relatively to the pivot connecting the power arm and load lever such spring being adapted to yield whenever the force exerted on the power arm exceeds a predetermined limit whereby the power arm and load lever are moved relatively to each other and means operated by such relative movement of the power arm and load lever, such means comprising an element adapted to come into contact with the hand actuating the power arm, whenever the power arm and the load lever are thus moved relatively to each other, and means for throwing out of action the said spring such means comprising a stop adjustable on one of the power transmitting arms and adapted to engage in one of its positions with the other power transmitting arm.

18. In combination with a hand actuated power arm a load lever pivoted to the power arm, a spring interposed between the power arm and load lever, means for adjusting the said spring relatively to the pivot connecting the power arm and load lever, such spring being adapted to yield whenever the force exerted on the power arm exceeds a predetermined limit whereby the power arm and load lever are moved relatively to each other and means operated by such relative movement of the power arm and load lever such means comprising an element adapted to come into contact with the hand actuating the power arm, whenever the power arm and the load lever are thus moved relatively to each other and a sleeve slidable on one of the power transmitting arms, a hole in such arm adapted to be covered by such sleeve and a pin secured to the other of the power transmitting arm opposite the said hole.

19. In combination with a hand actuated power arm a load lever enclosed by and pivoted to the power arm, a spring interposed between the power arm and load lever, means for adjusting the said spring relatively to the pivot connecting the power arm and load lever such spring being adapted to yield whenever the force exerted on the power arm exceeds a predetermined limit whereby the power arm and load lever are moved relatively to each other and means operated by such relative movement of the power arm and load lever, such means comprising an element adapted to come into contact with the hand actuating the power arm, whenever the power arm and the load lever are thus moved relatively to each other.

20. In combination with a hand actuated power arm a load lever enclosed by and pivoted to the power arm, a spring interposed between the power arm and load lever, means for adjusting the said spring relatively to the pivot connecting the power arm and load lever such spring being adapted to yield whenever the force exerted on the power arm exceeds a predetermined limit whereby the power arm and load lever are moved relatively to each other and means operated by such relative movement of the power arm and load lever such means comprising a pin mounted on the load lever and a hole opposite such pin in the power arm for permitting the said pin to pass through and to come into contact with the operator's hand whenever the power arm and the load lever are moved relatively to each other.

21. In combination with a hand actuated power arm a load lever enclosed by and pivoted to the power arm, a spring interposed between the power arm and load lever, means for adjusting the said spring relatively to the pivot connecting the power arm and load lever such spring being adapted to yield whenever the force exerted on the power arm exceeds a predetermined limit whereby the power arm and load lever are moved relatively to each other and means operated by such relative movement of the power arm and load lever such means comprising a pin mounted on the load lever and a hole opposite such pin in the power arm for permitting the said pin to pass through and come into contact with the operator's hand whenever the power arm and the load lever are moved relatively to each other, and a hole opposite the said pin on the opposite side of the power arm for permitting the said pin to pass through and come into contact with another part of the operator's hand in the normal relative position of the power arm and hand lever.

22. An apparatus for limiting the force transmitted in tools and machines substantially as described.

In testimony whereof I have signed my name to this specification.

IVAN BENKÖ.

Witnesses:
ARTHUR BAUMANN,
CARL COUDENBERG.